Nov. 26, 1957  B. F. KUPFERT ET AL  2,814,513
FLEXIBLE DIAPHRAGM TYPE SEAL ASSEMBLY
Filed April 5, 1955
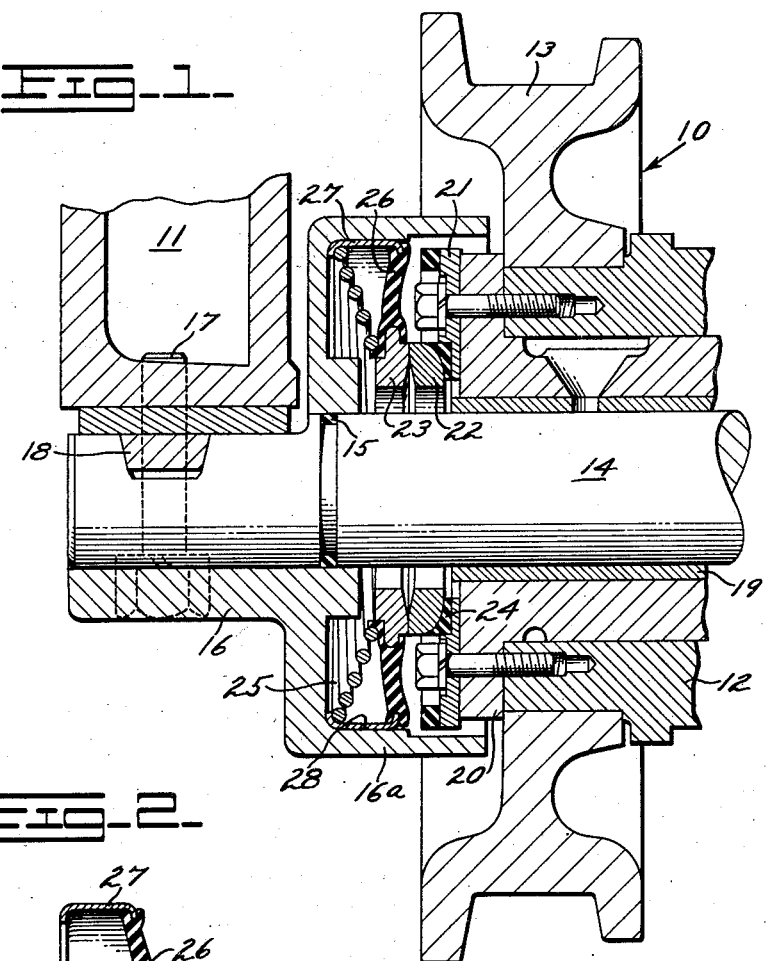
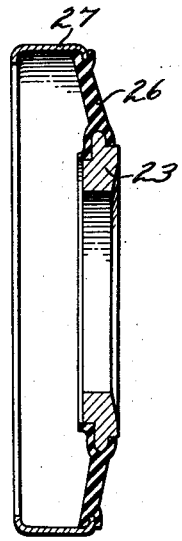
INVENTORS
BERNARD F. KUPFERT
JOHN W. PAGE
BY
ATTORNEYS United States Patent Office 2,814,513
Patented Nov. 26, 1957

2,814,513

FLEXIBLE DIAPHRAGM TYPE SEAL ASSEMBLY

Bernard F. Kupfert, Peoria, and John W. Page, Washington, Ill., assignors to Caterpillar Tractor Co., Peoria, Ill., a corporation of California Application April 5, 1955, Serial No. 499,348

2 Claims. (Cl. 286—11)

This invention relates to seals, and particularly to seals employed for retaining lubricant in and excluding foreign matter such as dust and other abrasive substances from the vicinity of bearing surfaces between relatively movable parts.

For the purpose of illustration, the invention is shown as applied to the track roller of a track-type tractor. Such track rollers are subjected to extremely heavy duty in an environment of dust, mud, sand or other substances of abrasive nature, and therefore present an unusually difficult problem in lubrication of and exclusion of foreign substances from their bearing surfaces. However, this invention is not limited to the particular structure shown as it is capable of being used as a sealing means between any parts which are relatively movable.

It is common practice to provide resilient "metal-to-metal" seals between relatively rotating parts, such as a shaft and a wheel, to retain lubricant in the area of the bearing surfaces of such parts and also to exclude foreign substances which mix with and destroy the efficiency of the lubricant and some of which abrade the bearing surfaces. Conventional "metal-to-metal" seals usually employ two sealing rings urged into face-to-face contact as by springs, one of the rings being resiliently supported by the wheel and the other being supported as by a circular resilient diaphragm bonded to the shaft and to the seal ring. In order to maintain unit face loads on the seal faces within workable limits as the springs are compressed and the resilient diaphragm is distorted in operation, the diaphragm is usually quite thin in cross-section. These diaphragms have inherent disadvantages in that they do not provide good radial stability for the seal ring and are subject to damage by foreign particles tending to abrade the diaphragm.

Furthermore, it has been found that when the diaphragms are placed in tension due to flexing or deflecting in operation, high stresses are imposed on the bonds between the shafts and the diaphragm as well as between the seal ring and the diaphragm with resulting relatively short service life of the seal.

It is an object of this invention to provide a resilient seal characterized by a low variation in the unit load on the sealing faces throughout a wide range of assembled positions.

It is a further object of the present invention to provide a seal diaphragm configuration which will permit the use of a thicker diaphragm as well as permit the use of harder and tougher diaphragm materials to increase resistance to abrasion of the diaphragm as well as provide more positive centering and driving means for the seal faces without an objectionable change in the face load on the sealing rings.

A still further object of the invention is to provide a seal in which the diaphragm is placed in radial compression so that during flexing or deflection in operation there is further increased resistance to abrasion as well as increased bond life between the diaphragm and its associated parts.

In the drawings:

Fig. 1 is a vertical sectional view of one-half of a track roller for a track-type tractor illustrating the application of a seal constructed in accordance with the present invention; and Fig. 2 is an enlarged view in vertical longitudinal section, illustrating the improved seal diaphragm and seal ring to which the present invention is particularly directed.

In Fig. 1, a portion of a track roller is generally indicated at 10. This roller is of the kind employed on track-type tractors in which an endless track is continuously laid upon the ground by a driving wheel or sprocket which, at the same time, drives the tractor. The principal weight of the tractor is supported by rollers such as shown at 10, which ride over suitable track elements formed on the inside of the endless track. The roller 10 is one of several which are supported for operation between a pair of frame members, one of which is shown at 11. The roller 10 comprises a hub 12 and track engaging rims, one of which is shown at 13. A non-rotatable shaft 14 extends through the hub 12, and is provided with a static ring seal 15. The shaft 14 is secured to the truck frame member 11 by a collar 16, which embraces the end of the shaft and is, in turn, secured to the frame member 11 as by capscrew 17. The collar 16 is provided with an internally formed key 18 registering with a recess in the shaft to prevent the shaft from moving laterally with respect to the frame member. The roller assembly has a sleeve-type bearing 19 for rotation about the shaft with the outer flanged end of a bushing 20 secured to the hub 12 by capscrews as shown, which capscrews also non-rotatably secure in place a retainer ring 21.

Lubricant introduced by means of a fitting (not shown) is retained within the roller assembly by means of seals provided at each end of the hub. These seals also prevent foreign substances from entering the roller assembly to deteriorate the lubricant or injure the bearing surfaces. Each of the seals comprises a pair of annular metal sealing rings 22 and 23 with engaging relatively rotatable faces. While these sealing rings are shown as formed of metal, any hard surface material— for example, glass or ceramic—may be substituted for metal in one or both of the rings 22 and 23. The inner seal ring 22 is backed by a gasket 24 of resilient material, such as rubber, which may be bonded to the seal ring 22 or the retainer ring 21, or both. Since the ring 21 is secured to the hub 12, the inner seal ring 22 will also rotate with the hub due to the gasket 24 being bonded to, or in tight contact with, both the rings 21 and 22. The outer seal ring 23 is normally urged axially into a metal-to-metal sealing contact with the inner seal ring 22 by means of a captive spring assembly 25. The spring 25 automatically compensates for wear and urges the sealing surfaces into proper adjustment.

Extending radially from the outer sealing ring 23, and secured thereto as by bonding or other means, is a diaphragm 26 of resilient material. When unstressed this diaphragm is of a convex or generaly frusto-conical shape as illustrated in Fig. 2. The connection of the diaphragm with the ring 23 is reinforced when assembled by the abutment of the spring 25 with the diaphragm. The outer periphery of the diaphragm 26 is likewise secured to a ring 27 which also serves as a seat for the spring 25. The outer ring 23, spring 25, diaphragm 26, and ring 27 are fixed against rotation with respect to hub 10 by a press fit of ring 27 in a bore 28 in a cup like extension 16a of collar 16. However, spring 25 and diaphragm 26 permit limited axial movement of seal ring 23.

When the unstressed diaphragm shown in Fig. 2 is assembled in the roller assembly, as illustrated in Fig. 1, seal ring 23 is displaced to the left with respect to the support ring 27 and the frusto-conical diaphragm is compressed to a substantially flat shape and remains in compression throughout the entire range of movement of the seal ring 23. In this condition no tensile stresses are imposed upon the bonds or connections between the diaphragm 26 and ring 27 or between the diaphragm and ring 23. Furthermore, in the absence of spring 25, the force required to displace ring 23 axially with respect to ring 27 is extremely small, and remains relatively constant throughout the entire range of movement of seal ring 23. Thus, the axial force which maintains sealing contact between ring 23 and ring 22 derives largely from spring 25, which maintains the proper axial sealing force throughout the full range of axial travel of ring 23.

We claim:

1. In a seal which includes a pair of relatively rotatable annular seal members in face to face contact and having resilient means urging one seal member toward the other to provide a desired pressure at their contacting faces, and an impervious annular flexible diaphragm supporting said one seal, said diaphragm being inherently of frusto-conical shape with the convex side coincident with the sealing face of said one seal when unstressed but being distorted upon assembly of the seal to a substantialy flat condition in which its tendency to exert an axial thrust is minimized and the desired pressure exerted by said resilient means is varied only slightly by relative axial movement of the sealed parts.

2. In a seal which includes a pair of relatively rotatable annular seal members in face to face contact inclosed in a housing part having one closed end, a spring disposed between said housing end and one seal member to impose a desired pressure at their contacting faces, and an annular resilient diaphragm providing a support between the housing part and said one seal, the improvement which comprises an inherently frusto-conical shape of said diaphragm having its convex side on the side of the sealing face of said one seal when unstressed and which is distorted upon assembly of the seal parts to a relatively flat shape in which the tendency of axial thrust is minimized to avoid variations in said desired pressure enabling the use of heavy durable material in the diaphragm and causing compressive stresses in the diaphragm to strengthen its connections with the seal member and the housing.

References Cited in the file of this patent
UNITED STATES PATENTS

| | | |
|---|---|---|
| 2,214,243 | Casson | Sept. 10, 1940 |
| 2,362,438 | Marsh | Nov. 7, 1944 |
| 2,395,359 | Vedovell | Feb. 19, 1946 |
| 2,481,430 | Koller | Sept. 6, 1949 |